US006436514B1

(12) United States Patent
Ishiyama et al.

(10) Patent No.: US 6,436,514 B1
(45) Date of Patent: Aug. 20, 2002

(54) INK JET RECORDING SHEET AND METHOD FOR PRODUCING THE SAME

(75) Inventors: Kenyuki Ishiyama; Hirokazu Yamamoto, both of Tokyo (JP)

(73) Assignee: Mitsubishi Paper Mills Limited, Tokyo (JP)

( * ) Notice: Subject to any disclaimer, the term of this patent is extended or adjusted under 35 U.S.C. 154(b) by 0 days.

(21) Appl. No.: 09/425,728

(22) Filed: Oct. 22, 1999

(30) Foreign Application Priority Data

| | | |
|---|---|---|
| Oct. 26, 1998 | (JP) | 10-303771 |
| Sep. 1, 1999 | (JP) | 11-247460 |

(51) Int. Cl.[7] .......................... B32B 27/14; B32B 3/00

(52) U.S. Cl. ...................... 428/195; 428/328; 428/331; 428/688

(58) Field of Search ................................ 428/195, 328, 428/331, 688

(56) References Cited

U.S. PATENT DOCUMENTS

| | | | | | |
|---|---|---|---|---|---|
| 5,302,437 | A | * | 4/1994 | Idei et al. | 428/195 |
| 5,372,884 | A | * | 12/1994 | Abe et al. | 428/331 |
| 5,397,764 | A | * | 3/1995 | Yokoyama et al. | 503/227 |
| 5,496,634 | A | * | 3/1996 | Ogawa et al. | 428/341 |
| 5,576,088 | A | * | 11/1996 | Ogawa et al. | 428/327 |
| 5,635,297 | A | * | 6/1997 | Ogawa et al. | 428/342 |
| RE36,303 | E | * | 9/1999 | Ogawa et al. | 428/341 |
| 6,132,878 | A | * | 10/2000 | Kojima et al. | 428/411.1 |
| 6,140,389 | A | * | 10/2000 | Kato et al. | 523/160 |

FOREIGN PATENT DOCUMENTS

| | | |
|---|---|---|
| EP | 0 742 107 A2 | 11/1996 |
| JP | 63-265680 | 11/1988 |
| JP | 2-274587 | 11/1990 |
| JP | 5-59694 | 3/1993 |
| JP | 6-278357 | 10/1994 |
| JP | 9-39376 | 2/1997 |

* cited by examiner

*Primary Examiner*—Bruce H. Hess
*Assistant Examiner*—B. Shewareged
(74) *Attorney, Agent, or Firm*—Armstrong, Westerman & Hattori, LLP

(57) ABSTRACT

The object of the present invention is to provide ink jet recording sheets having a high color forming property and causing no troubles in carrying them in printers. In ink jet recording sheets having at least one ink receiving layer and a gloss developing layer coated by a cast coating method laminated in succession on one side of a support and a back-coat layer comprising a pigment and a binder on another side of the support, the static friction coefficient between the gloss developing layer and the back-coat layer is adjusted to 0.9 or lower under the conditions of 20° C. and 65%RH. Furthermore, the object can be attained by using an alumina hydrate as the pigment in the gloss developing layer and a specific pigment and a lubricant in the back-coat layer.

9 Claims, No Drawings

INK JET RECORDING SHEET AND METHOD FOR PRODUCING THE SAME

BACKGROUND OF THE INVENTION

The present invention relates to an ink jet recording sheet having high gloss and used for printers which utilize the ink jet recording system. Particularly, it relates to an ink jet recording sheet of high gloss which is improved in running property during being carried in printers and color forming property.

Ink jet recording system performs recording of images or letters by ejecting ink droplets according to various principles and absorbing them into recording sheets such as paper. The recording system has the features that it is carried out at high speed, produces little noise, is easy to perform multicolor printing, is great in versatility of patterns to be recorded, and requires no development and fixation step, and recently rapidly spreads in various uses for recording various figures and color images including Chinese characters. Furthermore, the color images obtained by multicolor ink jetting systems are not inferior in the resulting color images to multicolor prints obtained by platemaking methods or images obtained by color photographic systems. Moreover, when a small number of prints are to be produced, they can produce the prints more cheaply than the photographic techniques. Thus, ink jet recording system is being applied to the field of full-color image recording.

Furthermore, owing to demand by the market for further improvement in image quality, it is attempted for the printers utilizing the ink jet recording system to enhance the resolution and enlarge the scope of color reproduction. Thus, it becomes essential that ink jet recording sheets which are recording media have high ink receiving capacity and have a coat excellent in color forming property for attaining high image quality. In addition, it is also desired that appearance such as gloss, stiffness and hue are similar to those of the silver salt photographs and those of printing papers.

Hitherto, for giving gloss, it is generally known to smoothen the surface of the coat by passing the sheet between rolls to which pressure and temperature are applied using calendering apparatuses such as super calender and gloss calender. However, if an ink jet recording sheet is subjected to calendering treatment under a high linear pressure for the purpose of giving gloss to the sheet, gloss is improved, but voids of the coat decrease to cause slow absorption of ink and overflow of ink due to insufficient absorption capacity. Therefore, it is difficult to obtain high gloss by calendering treatment.

In order to give high gloss to a coat without lowering ink absorbability, for example, JP-A-63-265680, JP-A-2-274587 and JP-A-5-59694 disclose to produce ink jet recording sheets by cast coating method. According to this method, since the specular configuration of the casting drum is transferred to the ink jet recording sheet, the smoothness of the surface becomes very high and a strong gloss can be obtained. Moreover, the linear pressure at which the sheet is pressed to the casting drum is lower than when a calendering apparatus is used, and, therefore, good ink absorbability is obtained.

When printers utilizing the ink jet system are used, in some cases, one figure is printed on a plurality of ink jet recording sheets and, in some cases, a plurality of figures are continuously printed. In these cases, the ink jet recording sheets can be fed one by one, but, in general, a large number of the ink jet recording sheets are set and continuously fed. In this case, if feeding property or running property of the sheets is inferior, such troubles are caused that the sheets cannot be fed to printers or a plurality of the sheets are fed at one time and clog the printers to stop them. In case a plurality of the sheets are fed with slipping from each other, printing of the figure is carried out over a plurality of the sheets.

SUMMARY OF THE INVENTION

The object of the present invention is to provide an ink jet recording sheet of high gloss which has high color forming property and causes no troubles in carrying of them in printers, thereby to solve the above problems.

As a result of intensive research conducted by the inventors in an attempt to solve the above problems, the present invention has been, accomplished.

That is, the present invention is an ink jet recording sheet having at least one ink receiving layer and a gloss developing layer laminated in succession on one side of a support and a back-coat layer comprising a pigment and a binder on another side of the support, said gloss developing layer having been coated by a cast coating method, wherein a static friction coefficient between the gloss developing layer and the back-coat layer is 0.9 or lower under the conditions of 20° C. and 65%RH. The static friction coefficient in the present invention is a value measured in accordance with JIS P8147, except that the moving speed is 250 mm/min.

Moreover, the effect of the present invention is greater when the gloss developing layer is provided by coating a coating composition comprising an alumina hydrate and then subjecting the coat to casting treatment.

Furthermore, the pigment used in the back-coat layer is preferably at least one selected from the group consisting of kaolin, talc, calcium carbonate and synthetic amorphous silica because the static friction coefficient between the back-coat layer and the gloss developing layer can be easily adjusted to the smaller level.

Preferably, the coating composition forming the back-coat layer contains a lubricant because the static friction coefficient between the back-coat layer and the gloss developing layer becomes further smaller.

The present invention further provides a method for producing an ink jet recording sheet which comprises providing at east one ink receiving layer on one side of a support, then providing a gloss developing layer thereon by a cast coating method comprising coating a coating composition for the gloss developing layer, pressing the coat still in wet state to a heated specular roll and drying the coat, and, thereafter, providing a back-coat layer comprising a pigment and a binder on another side (back side) of the support.

DETAILED DESCRIPTION OF THE INVENTION

The present invention will be explained in detail below.

The present invention is an ink jet recording sheet which has a high color forming property and causes no troubles when being carried in printers.

The inventors have considered that the troubles which occur when the ink jet recording sheets are carried in a printer are caused by the too high friction coefficient between the superposed ink jet recording sheets. Especially, ink jet recording sheets obtained by cast coating method are very high in smoothness of the side having gloss surface and, hence, the friction coefficient between the side having gloss surface and the another side (the back side) is apt to be very high. In case the side having gloss surface is subjected to a treatment to lower the smoothness, the gloss is also lowered. It is effective to previously add materials such as lubricants which lower frictional force to the gloss developing layer. However, fatty acid metallic salts generally have a large particle size and cannot inhibit decrease of gloss, and, besides, they sometimes deteriorate image quality. Similarly, when an overcoat layer is provided on the side having gloss to lower the frictional force, the gloss lowers and the image quality deteriorates. Thus, it has been difficult to sufficiently lower the frictional force with keeping the high gloss thereby securing the feeding property of the sheets and the running property of the sheets when carried in the printers.

Furthermore, JP-A-9-39376 discloses a method of coating a composition containing alumina hydrate on a support by cast coating method to enhance color forming property. In this case, although the cause is not clear, the friction coefficient of the gloss surface is apt to increase than when using other pigments such as colloidal silica, and the sheet feeding property and running property in printers are deteriorated. When an overcoat layer is provided in order to lower the frictional force, image quality is deteriorated, and the effect of the alumina hydrate cannot be sufficiently exhibited.

The inventors have found that ink jet recording sheets having high color forming property and causing no troubles in carrying them in printers can be obtained by providing a back-coat layer comprising a pigment and a binder on the back side of a support which is opposite to the side having a gloss developing layer coated by cast coating method, thereby controlling the static friction coefficient between the gloss developing layer and the back-coat layer. Thus, the present invention has been accomplished.

The casting treatment in the present invention is a process comprising pressing a coat still in wet state to a heated specular roll and drying the coat. The cast coating method includes a step of coating a coating composition on a support, etc. and the casting treatment subsequently effected. This cast coating method is generally the same as the method for producing cast coated papers for printing. The method includes a direct method, a coagulation method, a rewet method, etc. The direct method comprises coating a gloss developing layer, and then pressing the layer still in undried state (wet state) to a heated specular roll to dry the layer. The coagulation method comprises coating a gloss developing layer, coagulating the layer in undried state with a coagulating liquid, and then pressing the layer to a heated specular roll to dry the layer. The rewet method comprises coating a gloss developing layer and drying it, then rewetting the layer with a wetting liquid mainly composed of water, and pressing the layer to a heated specular roll to dry the layer. The surface roughness of the specular roll, the diameter of the specular roll, the pressure (linear pressure) at pressing, and coating speed can be optionally selected as in the case of production of commercially available cast coated papers for printing.

At least one of the following pigments or particles can be used in the ink receiving layer of the present invention. For example, mention may be made of inorganic pigments such as precipitated calcium carbonate, heavy calcium carbonate, magnesium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, alumina, alumina hydrate, aluminum hydroxide, lithopone, zeolite, hydrated halloysite, and magnesium hydroxide; organic pigments such as styrene plastic pigments, acrylic plastic pigments, polyethylene, microcapsules, urea resins, and melamine resins. Among these pigments, as the main component in the ink receiving layer, preferred are porous inorganic pigments such as porous synthetic amorphous silica, porous magnesium carbonate, and porous alumina. Porous amorphous silica large in pore volume is especially preferred.

In the gloss developing layer of the present invention, the following pigments or particles can be used in optional combinations. For example, mention may be made of inorganic pigments such as precipitated calcium carbonate, heavy calcium carbonate, magnesium carbonate, kaolin, aluminum silicate, diatomaceous earth, calcium silicate, magnesium silicate, synthetic amorphous silica, colloidal silica, alumina, alumina hydrate, and aluminum hydroxide; organic pigments such as styrene plastic pigments, acrylic plastic pigments, polyethylene, microcapsules, urea resins, and melamine resins. Among them, preferred are ultrafine inorganic pigments having a very small primary particle size, such as colloidal silica, synthetic amorphous silica and alumina hydrate. Especially when alumina hydrate is used as a main component of the pigment, the color forming property is enhanced, and, thus, use of it is more preferred. It is preferred to use the alumina hydrate in an amount of 100–30 parts by weight in 100 parts by weight of the pigment in the gloss developing layer.

At least one of the pigments or particles used in the ink receiving layer can be used in the back-coat layer of the present invention, but they must be properly selected so that the static friction coefficient between the gloss developing layer and the back-coat layer is 0.9 or lower under the conditions of 20° C. and 65%RH. Especially, when the pigment used in the back-coat layer is at least one selected from the group consisting of kaolin, talc, calcium carbonate and synthetic amorphous silica, the static friction coefficient between the gloss developing layer and the back-coat layer can be easily adjusted to 0.9 or lower, and these pigments are preferred.

As the binders used in the ink receiving layer, the gloss developing layer coated by the cast coating method, and the back-coat layer, mention may be made of, for example, starch derivatives such as oxidized starch, etherified starch and phosphoric acid esterified starch; cellulose derivatives such as carboxymethyl cellulose and hydroxyethyl cellulose; casein, gelatin, soybean protein, polyvinyl alcohol or derivatives thereof; polyvinyl pyrrolidone, maleic anhydride resin, and conjugated diene copolymer latices such as styrene-butadiene copolymer and methyl methacrylate-butadiene copolymer; acrylic polymer latices such as polymers or copolymers of acrylate esters and methacrylate esters; vinyl polymer latices such as ethylene-vinyl acetate copolymer; functional group-modified polymer latices obtained by modifying the said polymers with monomers containing functional groups such as carboxyl group; the said polymers which are cationized with cation groups, the said polymers the surface of which is cationized with cationic surface active agents, the said polymers the surface of which is distributed with polyvinyl alcohol by carrying out polymerization in the presence of cationic polyvinyl alcohol, and the said polymers the surface of which is distributed with cationic colloid particles by carrying out polymerization in a suspension of the cationic colloid particles; aqueous binders, e.g., thermosetting synthetic resins such as melamine resin and urea resin; polymer or copolymer resins of acrylate esters or methacrylate esters, such as polymethyl methacrylate; and synthetic resin binders such as polyurethane resin, unsaturated polyester resin, vinyl chloride-vinyl acetate copolymer, polyvinyl butyral, and alkyd resin.

Amount of the binder in the ink receiving layer or the gloss developing layer is preferably 5–70 parts by weight, more preferably 10–50 parts by weight based on 100 parts by weight of the pigment in the ink receiving layer or the gloss developing layer. If the amount is less than 5 parts by weight, coat strength of the ink receiving layer and the gloss developing layer is insufficient, and if it is more than 70 parts by weight, absorbability of ink is deteriorated. Coating amount of the ink receiving layer and the gloss developing layer is preferably 2 $g/m^2$ or more, more preferably 4–20 $g/m^2$ respectively, though it depends on the kind and amount of the pigment and the binder used, and the kind of ink jet recording apparatus.

Amount of the binder in the back-coat layer is preferably 5–70 parts by weight, more preferably 10–50 parts by weight based on 100 parts by weight of the pigment in the back-coat layer. If the amount is less than 5 parts by weight, strength of the back-coat layer is insufficient, and if it is more than 70 parts by weight, tackiness of the surface of the back-coat layer increases to make it difficult to adjust the static friction coefficient between the gloss developing layer and the back-coat layer to 0.9 or lower. Coating amount of the back-coat layer is preferably 2 $g/m^2$ or more, more preferably 4–20 $g/m^2$.

When lubricants, for example, fatty acids such as stearic acid and oleic acid, and metal salts thereof; and hydrocarbons such as microcrystalline wax and polyethylene emulsion are used in the back-coat layer, it becomes easy to adjust the static friction coefficient between the gloss developing layer and the back-coat layer to 0.9 or lower, and, thus, use of the lubricants is preferred. Amount of the lubricants used is not limited, and is preferably 10 parts by weight or less based on 100 parts by weight of the pigment in the back-coat layer. If the amount is more than 10 parts by weight, strength of the back-coat layer is insufficient.

Furthermore, the ink receiving layer, the gloss developing layer and the back-coat layer may optionally contain other additives such as pigment dispersant, thickening agent, fluidity improving agent, antifoamer, foam-inhibitor, releasing agent, foaming agent, penetrating agent, coloring dye, coloring pigment, fluorescent brightening agent, ultraviolet absorber, antioxidant, preservative, antifungal agent, water resisting agent, dye fixer, etc.

The supports used in the present invention include base papers made from mixtures comprising wood pulps, e.g., chemical pulps such as LBKP and NBKP, mechanical pulps such as GP, PGW, RMP, TMP, CTMP, CMP and CGP, and waste paper pulps such as DIP, or non-wood pulps such as kenaf, bagasse and cotton, with known pigments as main components, binders, and at least one additives such as sizing agent, fixing agent, yield improving agent, cationizing agent, and strengthening agent by using various apparatuses such as Fourdrinier paper machine, cylinder paper machine and twin-wire paper machine; the said base papers which are size press coated with starch, polyvinyl alcohol, etc. or provided with an anchoring coat layer; and coated papers such: as art papers, coated papers and cast coated papers comprising the said base papers provided with a coat layer. The layers according to the present invention may be provided on these base papers or coated papers as they are, or they may be subjected to calendering by calendering apparatuses such as machine calender, TG calender and soft calender for the purpose of controlling the smoothening of the surface. Basis weight of the supports is usually 40–300 $g/m^2$, but this is not limited.

The ink receiving layer, the gloss developing layer and the back-coat layer are coated in the manner of on-machine or off-machine using various apparatuses such as blade coater, roll coater, air: knife coater, bar coater, rod blade coater, curtain coater, short dowel coater, and size press.

After coating and drying the ink receiving layer, the layer may be subjected to calendering by calendering apparatuses such as machine calender, TG calender and soft calender before coating of the gloss developing layer for the purpose of controlling the smoothening.

The back-coat layer may be coated on the back side of the support after the ink receiving layer and the gloss developing layer are coated on the front side, or may be first coated on the back side and then the ink receiving layer and the gloss developing layer may be coated on the front side (another side). Alternatively, the back-coat layer may be coated on the back side of the support after the ink receiving layer is coated, and then the gloss developing layer may be coated on the ink receiving layer. However, when the back-coat layer is coated on the back side of the support before coating the gloss developing layer, gas permeability is sometimes deteriorated to cause blistering at the time of coating of the gloss developing layer by cast coating method. Therefore, it is preferred to coat the back-coat layer on the back side of the support after the ink receiving layer and the gloss developing layer have been coated.

After coating and drying the back-coat layer, the layer may be subjected to calendering by calendering apparatuses such as machine calender, TG calender and soft calender for the purpose of controlling the smoothening. However, excess calendering promotes smoothening, resulting in too much increase of the static friction coefficient between the back-coat layer and the gloss developing layer to cause troubles in carrying of the sheets in the printer. Thus, care should be taken in this respect.

As mentioned above, it is necessary in the present invention to adjust the static friction coefficient between the gloss developing layer and the back-coat layer to 0.9 or lower by suitably selecting kind, amount and coating amount of the pigment and the binder in the gloss developing layer, kind, amount and coating amount of the pigment and the binder in the back-coat layer, and, besides, finishing method after coating of the layers. However, if the static friction coefficient is too low, in the case of stacking a plurality of the sheets, they cannot be stably stacked, and, hence, 0.2 or higher is preferred.

The ink jet recording sheets of the present invention can be used not only as ink jet recording sheets, but also as any recording sheets to which inks liquid in recording are applied. As examples of these recording sheets, mention may be made of image receiving sheets for heat transfer recording which carries out the transfer by heating from back side an ink sheet comprising a thin support such as a resin film, a high-density paper or a synthetic paper coated with a heat-meltable ink mainly composed of a dye or a pigment, thereby melting the ink; ink jet recording sheets on which recording is carried out by heating and melting a heat-meltable ink, making the molten ink into fine droplets and ejecting the droplets to deposit them on the sheet; ink jet recording sheets which use an ink prepared by dissolving an oil-soluble dye in a solvent; and image receiving sheets used with photo-and heat-sensitive type donor sheets having microcapsules containing a photopolymerizable monomer and a colorless or colored dye or pigment.

The point common to these recording sheets is that the ink is in liquid state at the time of recording. The liquid ink penetrates into and spreads through the ink receiving layer in its depth direction and horizontal direction before it is solidified, coagulated or fixed. The above-mentioned recording sheets require the absorbability which depends on the manner of recording, and the ink jet recording sheets of the present invention can be utilized as the above-mentioned recording sheets without any problems.

Moreover, the ink jet recording sheets of the present invention can be used as recording sheets on which toners are fixed by heating in accordance with electrophotographic process widely used for copiers, printers, etc. Furthermore, they maybe used for labels with providing an adhesive layer.

DESCRIPTION OF THE PREFERRED EMBODIMENTS

The present invention will be explained in detail by the following examples, which never limit the invention. All parts and % in the examples are by weight unless otherwise notified.

<Preparation of Support>

A base paper as a support was prepared in the following manner.

A mixture composed of 100 parts of a wood pulp comprising 90 parts of LBKP (freeness: 400 mlcfs) and 10 parts of NBKP (freeness: 450 mlcfs), 5 parts of precipitated calcium carbonate, 0.1 part of a commercially available alkyl ketene dimer, 0.05 part of a commercially available cationic polyacrylamide, and 1.0 part of a commercially available cationized starch was prepared, and the mixture was subjected to paper making process using Fourdrinier paper machine to make a paper of 125 g/m$^2$ in basis weight. Then, oxidized starch: MS#3800 (registered trademark for an oxidized starch of Nihon Shokuhin Kako Co., Ltd.) was applied to the paper by an inclined size press apparatus of on-machine type to obtain a support of 127 g/m$^2$ in basis weight.

<Coating of Ink Receiving Layer>

A coating composition mainly composed of a porous pigment was coated on the support to obtain an ink receiving layer. The coating composition was prepared by mixing 100 parts of a commercially available synthetic amorphous silica: Mizukasil P-78D (registered trademark for a synthetic amorphous silica of Mizusawa Industrial Chemicals, Ltd.) as the porous pigment and 40 parts of a commercially available polyvinyl alcohol: PVA117 (registered trademark for a polyvinyl alcohol of Kuraray Co., Ltd.) as a binder. The resulting coating composition had a solid concentration of 17%. The coating composition was coated on the support by an air knife coater so as to give an absolute dry weight of 10 g/m$^2$, followed by drying to obtain the ink receiving layer.

EXAMPLE 1

A coating composition was coated by cast coating method on the ink receiving layer provided on the support to obtain a gloss developing layer. The coating composition was obtained by mixing 100 parts of a commercially available colloidal silica: Snowtex AK (registered trademark for a colloidal silica of Nissan Chemical Industries, Ltd.), 20 parts of a commercially available polyvinyl alcohol: PVA117 (registered trademark for a polyvinyl alcohol of Kuraray Co., Ltd.) as a binder, and 1 part of a commercially available nonionic olieic acid emulsion as a releasing agent. The resulting coating composition had a solid concentration of 14%. This coating composition was coated on the ink receiving layer by an air knife coater so as to give an absolute dry coating weight of 5 g/m$^2$, and pressed to a specular roll kept at a surface temperature of 100° C. for 10 seconds, followed by drying.

Then, a coating composition mainly composed of a pigment and a binder was coated on the back side of the support to obtain a back-coat layer. The coating composition was obtained by mixing 100 parts of commercially available heavy calcium carbonate as the pigment, 0.1 part of a commercially available polyacrylic acid dispersant as a dispersant, and 10 parts of a commercially available styrene-butadiene copolymer latex and 5 parts of a commercially available phosphoric acid esterified starch as binders. The resulting coating composition had a solid concentration of 35%. This coating composition was coated by an air knife coater so as to give an absolute dry coating weight of 7 g/m$^2$, followed by drying to obtain an ink jet recording sheet of Example 1.

EXAMPLE 2

The gloss developing layer was coated on the ink receiving layer by cast coating method in the same manner as in Example 1.

Then, a coating composition mainly composed of a pigment and a binder was coated on the back side of the support to obtain a back-coat layer. The coating composition was obtained by mixing 100 parts of a commercially available kaolin as the pigment, 0.1 part of a commercially available polyacrylic acid dispersant as a dispersant, and 10 parts of a commercially available styrene-butadiene copolymer latex and 5 parts of a commercially available phosphoric acid esterified starch as binders. The resulting coating composition had a solid concentration of 35%. This coating composition was coated and dried in the same manner as in Example 1 to obtain an ink jet recording sheet of Example 2.

EXAMPLE 3

The gloss developing layer was coated on the ink receiving layer by cast coating method in the same manner as in Example 1.

Then, a coating composition mainly composed of a pigment and a binder was coated on the back side of the support to obtain a back-coat layer. The coating composition was obtained by mixing 100 parts; of a commercially available synthetic amorphous silica: Mizukasil P-78D (registered trademark for a synthetic amorphous silica of Mizusawa Industrial Chemicals, Ltd.) as the porous pigment and 40 parts of a commercially available polyvinyl alcohol: PVA117 (registered trademark for a polyvinyl alcohol of Kuraray Co., Ltd.) as the binder. The resulting coating composition had a solid concentration of 17%. This coating composition was coated and dried in the same manner as in Example 1 to obtain an ink jet recording sheet of Example 3.

EXAMPLE 4

The gloss developing layer was coated on the ink receiving layer by cast coating method in the same manner as in Example 1.

Then, a coating composition mainly composed of a pigment and a binder was coated on the back side of the support to obtain a back-coat layer. The coating composition was obtained by mixing 100 parts of a commercially available talc as the pigment, 0.1 part of a commercially available polyacrylic acid dispersant as a dispersant, and 10 parts of a commercially available styrene-butadiene copolymer latex and 5 parts of a commercially available phosphoric acid esterified starch as binders. The resulting coating composition had a solid concentration of 35%. This coating composition was coated and dried in the same manner as in Example 1 to obtain an ink jet recording sheet of Example 4.

EXAMPLE 5

The gloss developing layer was coated on the ink receiving layer by cast coating method in the same manner as in Example 1.

Then, a coating composition mainly composed of a pigment and a binder was coated on the back side of the support to obtain a back-coat layer. The coating composition was obtained by mixing 100 parts in solid content of an urea resin based organic pigment: U-Pearl C-125 (registered trademark for a pigment of Mitsui Chemicals, Inc.), 0.1 part of a commercially available polyacrylic acid dispersant as a dispersant, and 10 parts of a commercially available styrene-butadiene copolymer latex and 5 parts of a commercially available phosphoric acid esterified starch as binders. The resulting coating composition had a solid concentration of 35%. This coating composition was coated and dried in the same manner as in Example 1 to obtain an ink jet recording sheet of Example 5.

EXAMPLE 6

A coating composition was coated by cast coating method on the ink receiving layer provided on the support to obtain a gloss developing layer. The coating composition was obtained by mixing 70 parts of a commercially available alumina sol: Cataloid AS3 (registered trade mark for an alumina sol of Shokubai Kasei Co., Ltd.) and 30 parts of a commercially available colloidal silica: Snowtex AK (registered trademark for a colloidal silica of Nissan Chemical Industries, Ltd.) as pigments, 20 parts of a commercially available polyvinyl alcohol: PVA117 (registered trademark for a polyvinyl alcohol of Kuraray Co., Ltd.) as the binder, and 1 part of a commercially available nonionic oleic acid emulsion as a releasing agent. The resulting coating composition had a solid concentration of 13%. This coating composition was coated and dried in the same manner as in Example 1 to obtain a gloss developing layer.

Then, a coating composition mainly composed of a pigment and a binder was coated on the back side of the support to obtain a back-coat layer. The coating composition was obtained by mixing 100 parts of a commercially available heavy calcium carbonate as the pigment, 0.1 part of a commercially available polyacrylic acid dispersant as a dispersant, and 10 parts of a commercially available styrene-butadiene copolymer latex and 5 parts of a commercially available phosphoric acid esterified starch as binders. The resulting coating composition had a solid concentration of 35%. This coating composition was coated and dried in the same manner as in Example 1 to obtain an ink jet recording sheet of Example 6.

EXAMPLE 7

The gloss developing layer was coated on the ink receiving layer by cast coating method in the same manner as in Example 6.

Then, a coating composition mainly composed of a pigment and a binder was coated on the back side of the support to obtain a back-coat layer. The coating composition was obtained by mixing 100 parts of a commercially available kaolin as the pigment, 0.1 part of a commercially available polyacrylic acid dispersant as a dispersant, and 10 parts of a commercially available styrene-butadiene copolymer latex and 5 parts of a commercially available phosphoric acid esterified starch as binders. The resulting coating composition had a solid concentration of 35%. This coating composition was coated and dried in the same manner as in Example 1 to obtain an ink jet recording sheet of Example 7.

EXAMPLE 8

The gloss developing layer was coated on the ink receiving layer by cast coating method in the same manner as in Example 6.

Then, a coating composition mainly composed of a pigment and a binder was coated on the back side of the support to obtain a back-coat layer. The coating composition was obtained by mixing 100 parts of a commercially available synthetic amorphous silica: Mizukasil P-78D (registered trademark for a synthetic amorphous silica of Mizusawa Industrial Chemicals, Ltd.) as the porous pigment and 40 parts of a commercially available polyvinyl alcohol: PVA117 (registered trademark for a polyvinyl alcohol of Kuraray Co., Ltd.) as the binder. The resulting coating composition had a solid concentration of 17%. This coating composition was coated and dried in the same manner as in Example 1 to obtain an ink jet recording sheet of Example 8.

EXAMPLE 9

The gloss developing layer was coated on the ink receiving layer by cast coating method in the same manner as in Example 6.

Then, a coating composition mainly composed of a pigment and a binder was coated on the back side of the support to obtain a back-coat layer. The coating composition was obtained by mixing 100 parts of a commercially available talc as the pigment, 0.1 part of a commercially available polyacrylic acid dispersant as a dispersant, and 10 parts of a commercially available styrene-butadiene copolymer latex and 5 parts of a commercially available phosphoric acid esterified starch as binders. The resulting coating composition had a solid concentration of 35%. This coating composition was coated and dried in the same manner as in Example 1 to obtain an ink jet recording sheet of Example 9.

EXAMPLE 10

The gloss developing layer was coated on the ink receiving layer by cast coating method in the same manner as in Example 6.

Then, a coating composition mainly composed of a pigment and a binder was coated on the back side of the support to obtain a back-coat layer. The coating composition was obtained by mixing 100 parts in solid content of an urea resin-based organic pigment: U-Pearl C-125 (registered trademark for a pigment of Mitsui Chemicals, Inc.), 0.1 part of a commercially available plyacrylic acid dispersant as a dispersant, and 10 parts of a commercially available styrene-butadiene copolymer latex and 5 parts of a commercially available phosphoric acid esterified starch as binders. The resulting coating composition had a solid concentration of 35%. This coating composition was coated and dried in the same manner as in Example 1 to obtain an ink jet recording sheet of Example 10.

EXAMPLE 11

A coating composition was coated by cast coating method on the ink receiving layer provided on the support to obtain a gloss developing layer. The coating composition was obtained by mixing 100 parts of a commercially available alumina sol: Cataloid AS3 (registered trade mark for an alumina sol of Shokubai Kasei Co., Ltd.), 20 parts of a commercially available polyvinyl alcohol: PVA117 (registered trademark for a polyvinyl alcohol of Kuraray Co., Ltd.) as the binder, and 1 part of a commercially available nonionic oleic acid emulsion as a releasing agent. The resulting coating composition had a solid concentration of 13%. This coating composition was coated and dried in the same manner as in Example 1 to obtain a gloss developing layer.

Then, a coating composition mainly composed of a pigment and a binder was coated on the back side of the support to obtain a back-coat layer. The coating composition was obtained by mixing 100 parts of a commercially available heavy calcium carbonate as the pigment, 0.1 part of a commercially available polyacrylic acid dispersant as a dispersant, and 10 parts of a commercially available styrene-butadiene copolymer latex and 5 parts of a commercially available phosphoric acid esterified starch as binders. The resulting coating composition had a solid concentration of 35%. This coating composition was coated and dried in the same manner as in Example 1 to obtain an ink jet recording sheet of Example 11.

EXAMPLE 12

The gloss developing layer was coated on the ink receiving layer by cast coating method in the same manner as in Example 11.

Then, a coating composition mainly composed of a pigment and a binder was coated on the back side of the support to obtain a back-coat layer. The coating composition was obtained by mixing 100 parts of a commercially available kaolin as the pigment, 0.1 part of a commercially available polyacrylic acid dispersant as a dispersant, and 10 parts of a commercially available styrene-butadiene copolymer latex and 5 parts of a commercially available phosphoric acid esterified starch as binders. The resulting coating composition had a solid concentration of 35%. This coating composition was coated and dried in the same manner as in Example 1 to obtain an ink jet recording sheet of Example 12.

EXAMPLE 13

The gloss developing layer was coated on the ink receiving layer by cast coating method in the same manner as in Example 11.

Then, a coating composition mainly composed of a pigment and a binder was coated on the back side of the support to obtain a back-coat layer. The coating composition was obtained by mixing 100 parts of a commercially available synthetic amorphous silica: Mizukasil P-78D (registered trademark for a synthetic amorphous silica of Mizusawa Industrial Chemicals, Ltd.) as the porous pigment and 40 parts of a commercially available polyvinyl alcohol: PVA117 (registered trademark for a polyvinyl alcohol of Kuraray Co., Ltd.) as the binder. The resulting coating composition had a solid concentration of 17%. This coating composition was coated and dried in the same manner as in Example 1 to obtain an ink jet recording sheet of Example 13.

EXAMPLE 14

The gloss developing layer was coated on the ink receiving layer by cast coating method in the same manner as in Example 11.

Then, a coating composition mainly composed of a pigment and a binder was coated on the back side of the support to obtain a back-coat layer. The coating composition was obtained by mixing 100 parts of a commercially available talc as the pigment, 0.1 part of a commercially available polyacrylic acid dispersant as a dispersant, and 10 parts of a commercially available, styrene-butadiene copolymer latex and 5 parts of a commercially available phosphoric acid esterified starch as binders. The resulting coating composition had a solid concentration of 35%. This coating composition was coated and dried in the same manner as in Example 1 to obtain an ink jet recording sheet of Example 14.

EXAMPLE 15

The gloss developing layer was coated on the ink receiving layer by cast coating method in the same manner as in Example 11.

Then, a coating composition mainly composed of a pigment and a binder was coated on the back side of the support to obtain a back-coat layer. The coating composition was obtained by mixing 100 parts in solid content of an urea resin-based organic pigment: U-Pearl C-125 (registered trademark for the pigment of Mitsui Chemicals, Inc.), 0.1 part of a commercially available polyacrylic acid dispersant as a dispersant, and 10 parts of a commercially available styrene-butadiene copolymer latex and 5 parts of a commercially available phosphoric acid esterified starch as binders. The resulting coating composition had a solid concentration of 35%. This coating composition was coated and dried in the same manner as in Example 1 to obtain an ink jet recording sheet of Example 15.

EXAMPLE 16

The gloss developing layer was coated on the ink receiving layer by cast coating method in the same manner as in Example 11.

Then, a coating composition mainly composed of a pigment and a binder was coated on the back side of the support to obtain a back-coat layer. The coating composition was obtained by mixing 100 parts of a commercially available kaolin as the pigment, 0.1 part of a commercially available polyacrylic acid dispersant as a dispersant, 10 parts of a commercially available styrene-butadiene copolymer latex and 5 parts of a commercially available phosphoric acid esterified starch as binders, and 1 part of a commercially available calcium stearate as a lubricant. The resulting coating composition had a solid concentration of 35%. This coating composition was coated and dried in the same manner as in Example 1 to obtain an ink jet recording sheet of Example 16.

EXAMPLE 17

The gloss developing layer was coated on the ink receiving layer by cast coating method in the same manner as in Example 11.

Then, a coating composition mainly composed of a pigment and a binder was coated on the back side of the support to obtain a back-coat layer. The coating composition was obtained by mixing 100 parts of a commercially available kaolin as the pigment, 0.1 part of a commercially available polyacrylic acid dispersant as a dispersant, 10 parts of a commercially available styrene-butadiene copolymer latex and 5 parts of a commercially available phosphoric acid esterified starch as binders, and 3 parts of a commercially available calcium stearate as a lubricant. The resulting coating composition had a solid concentration of 35%. This coating composition was coated and dried in the same manner as in Example 1 to obtain an inkjet recording sheet of Example 17.

EXAMPLE 18

The gloss developing layer was coated on the ink receiving layer by cast coating method in the same manner as in Example 11.

Then, a coating composition mainly composed of a pigment and a binder was coated on the back side of the support to obtain a back-coat layer. The coating composition was obtained by mixing 100 parts of a commercially available heavy calcium carbonate as the pigment, 0.1 part of a commercially available polyacrylic acid dispersant as a dispersant, 10 parts of a commercially available styrene-butadiene copolymer latex and 5 parts of a commercially available phosphoric acid esterified starch as binders, and 3 parts of a commercially available calcium stearate as a lubricant. The resulting coating composition had a solid concentration of 35%. This coating composition was coated and dried in the same manner as in Example 1 to obtain an ink jet recording sheet of Example 18.

EXAMPLE 19

The gloss developing layer was coated on the ink receiving layer by cast coating method in the same manner as in Example 11.

Then, a coating composition mainly composed of a pigment and a binder was coated on the back side of the support to obtain a back-coat layer. The coating composition was obtained by mixing 100 parts of a commercially available precipitated calcium carbonate as the pigment, 0.1 part of a commercially available polyacrylic acid dispersant as a dispersant, 10 parts of a commercially available styrene-butadiene copolymer latex and 5 parts of a commercially available phosphoric acid esterified starch as binders, and 3 parts of a commercially available calcium stearate as a lubricant. The resulting coating composition had a solid concentration of 35%. This coating composition was coated and dried in the same manner as in Example 1 to obtain an ink jet recording sheet of Example 19.

Comparative Example 1

The gloss developing layer was coated on the ink receiving layer by cast coating method in the same manner as in Example 1, and an ink jet recording sheet of Comparative Example 1 was obtained without providing a back-coat layer.

Comparative Example 2

The gloss developing layer was coated on the ink receiving layer by cast coating method in the same manner as in Example 6, and an ink jet recording sheet of Comparative Example 2 was obtained without providing a back-coat layer.

Comparative Example 3

The gloss developing layer was coated on the ink receiving layer by cast coating method in the same manner as in Example 11, and an ink jet recording sheet of Comparative Example 3 was obtained without providing a back-coat layer.

Comparative Example 4

The gloss developing layer was coated on the ink receiving layer by cast coating method in the same manner as in Example 11.

Then, a coating composition mainly composed of a pigment and a binder was coated on the back side of the support to obtain a back-coat layer. The coating composition was obtained by mixing 100 parts of a commercially available precipitated calcium carbonate as the pigment, 0.1 part of a commercially available polyacrylic acid dispersant as a dispersant, and 50 parts of a commercially available styrene-butadiene copolymer latex and 30 parts of a commercially available phosphoric acid esterified starch as binders. The resulting coating composition had a solid concentration of 35%. The coating composition was coated by an air knife coater so as to give an absolute dry coating weight of 7 g/m$^2$, followed by drying to obtain an ink jet recording sheet of Comparative Example 4.

Comparative Example 5

The gloss developing layer was coated on the ink receiving layer by cast coating method in the same manner as in Example 11.

Then, a coating composition mainly composed of a pigment and a binder was coated on the back side of the support to obtain a back-coat layer. The coating composition was obtained by mixing 100 parts of a commercially available kaolin as the pigment, 0.1 part of a commercially available polyacrylic acid dispersant as a dispersant, and 50 parts of a commercially available styrene-butadiene copolymer latex and 30 parts of a commercially available phosphoric acid esterified starch as binders. The resulting coating composition had a solid concentration of 35%. This coating composition was coated by an air knife coater so as to give an absolute dry coating weight of 7 g/m$^2$ , followed by drying to obtain an ink jet recording sheet of Comparative Example 5.

The main constituents in Examples and Comparative Examples are shown in Table 1.

The results of evaluation in Examples and Comparative Examples are shown in Table 2.

The evaluation shown in Table 2 was conducted by the following methods.

<Static Friction Coefficient>

A static friction coefficient between the gloss developing layer and the back-coat layer was measured in accordance with JIS P8147. A pair of samples was subjected to moisture conditioning for 24 hours under the conditions of 20° C. and 65%RH, and then a static frictional force between the gloss developing force and the back-coat layer was measured using a friction coefficient tester (Slip Tester manufactured by Tester Sangyo Co., Ltd.) under the conditions of 20° C. and 65%RH. One of the samples was placed with the back-coat layer facing upward and another of the sample was placed with the gloss developing layer facing downward, and these samples were piled with each other. Measurement was carried out under the conditions of a loading of 1 kg and a moving speed of 250 mm/min. The static friction coefficient was calculated from the measured static frictional force.

<Running Property of the Sheets Carried in the Printer>

So as to carry out printing on the gloss surface, twenty samples as one set were set in commercially available ink jet printers (PICTY 300 provided with a photo-ink cartridge: manufactured by Nippon Electric Co., Ltd.; BJC420J provided with a photo-ink cartridge: manufactured by Canon, Inc.; and PM700C: manufactured by Epson Co., Ltd.), and printing was carried out by continuously feeding the samples. The results are shown by the following grades. The grade "×" means a practically unacceptable level.

○: No troubles occurred in the three printers, namely, very good.

Δ: Occurrence of troubles on an average in the three printers was more than 0 and less than 5%.

×: Occurrence of troubles on an average in the three printers was more than 5%, which corresponds to occurrence of more than one trouble in one set in each printer.

<Color Forming Property>

Solid printing was carried out with black ink using a commercially available ink jet printer (PICTY 300 provided with a photo-ink cartridge: manufactured by Nippon Electric Co., Ltd.), and an optical reflective density of the solid print portion was measured by Macbeth densitometer (RD-919).

TABLE 1

| | Main pigment in gloss developing layer | Main pigment in back-coat layer | Comments on back-coat layer |
|---|---|---|---|
| Example 1 | Colloidal silica | Heavy calcium carbonate | |
| Example 2 | Colloidal silica | Kaolin | |
| Example 3 | Colloidal silica | Silica | |
| Example 4 | Colloidal silica | Talc | |
| Example 5 | Colloidal silica | Urea resin | |
| Example 6 | Colloidal silica 3 + alumina 7 | Heavy calcium carbonate | |
| Example 7 | Colloidal silica 3 + alumina 7 | Kaolin | |
| Example 8 | Colloidal silica 3 + alumina 7 | Silica | |
| Example 9 | Colloidal silica 3 + alumina 7 | Talc | |
| Example 10 | Colloidal silica 3 + alumina 7 | Urea resin | |
| Example 11 | Alumina | Heavy calcium carbonate | |
| Example 12 | Alumina | Kaolin | |
| Example 13 | Alumina | Silica | |
| Example 14 | Alumina | Talc | |
| Example 15 | Alumina | Urea resin | |
| Example 16 | Alumina | Kaolin | 1 part of lubricant |
| Example 17 | Alumina | Kaolin | 3 part of lubricant |
| Example 18 | Alumina | Heavy calcium carbonate | 3 part of lubricant |
| Example 19 | Alumina | Precipitated calcium carbonate | 3 part of lubricant |
| Comparative Example 1 | Colloidal silica | No back-coat layer | |
| Comparative Example 2 | Colloidal silica 3 + alumina 7 | No back-coat layer | |
| Comparative Example 3 | Alumina | No back-coat layer | |
| Comparative Example 4 | Alumina | Precipitated calcium carbonate | Increased binder content |
| Comparative Example 5 | Alumina | Kaolin | Increased binder content |

TABLE 2

| | Static friction coefficient | Running property in printer | Color forming property |
|---|---|---|---|
| Example 1 | 0.50 | ○ | 1.53 |
| Example 2 | 0.43 | ○ | 1.55 |
| Example 3 | 0.47 | ○ | 1.54 |
| Example 4 | 0.45 | ○ | 1.55 |
| Example 5 | 0.75 | Δ | 1.53 |
| Example 6 | 0.77 | ○ | 1.72 |
| Example 7 | 0.70 | ○ | 1.72 |
| Example 8 | 0.73 | ○ | 1.71 |
| Example 9 | 0.72 | ○ | 1.73 |
| Example 10 | 0.83 | Δ | 1.72 |
| Example 11 | 0.80 | ○ | 1.80 |
| Example 12 | 0.70 | ○ | 1.80 |
| Example 13 | 0.79 | ○ | 1.79 |
| Example 14 | 0.72 | ○ | 1.78 |
| Example 15 | 0.89 | Δ | 1.78 |
| Example 16 | 0.70 | ○ | 1.81 |
| Example 17 | 0.58 | ○ | 1.78 |
| Example 18 | 0.85 | ○ | 1.80 |
| Example 19 | 0.88 | ○ | 1.80 |
| Comparative Example 1 | 0.88 | X | 1.55 |
| Comparative Example 2 | 0.90 | X | 1.73 |
| Comparative Example 3 | 0.93 | X | 1.80 |
| Comparative Example 4 | 0.96 | X | 1.79 |
| Comparative Example 5 | 0.94 | X | 1.79 |

It can be seen from Examples 1–19 and Comparative Examples 1–5 that running property of the sheets carried in printers can be improved by adjusting the static friction coefficient between the gloss developing layer and the back-coat layer to 0.9 or lower. Furthermore, it can be seen from Examples 6–19 that when the pigment used in the gloss developing layer is mainly composed of an alumina hydrate, a high color forming property is obtained and the higher effect of the present invention can be exhibited. Comparative Examples 1–3 show that carrying property of the sheets is improved by providing a back-coat layer and adjusting the static friction coefficient to 0.9 or lower. As shown by Comparative Examples 4 and 5, the static friction coefficient between the gloss developing layer and the back-coat layer increases to cause troubles in carrying of the sheets depending on the amount of the binder in the back-coat layer.

As can be seen from the Examples, the present invention can provide ink jet recording sheets superior in running property during being carried in printers by adjusting the static friction coefficient between the gloss developing layer provided by cast coating method and the back-coat layer to a specific value. Furthermore, the present invention can provide ink jet recording sheets having a high color forming property by using an alumina hydrate as a main component of the pigment used in the gloss developing layer.

What is claimed is:

1. An ink jet recording sheet comprising:

a support;

at least one ink receiving layer and a gloss developing layer laminated in succession on one side of the support; and a back-coat layer comprising a pigment and binder provided on the other side of the support, wherein a static friction coefficient between the gloss developing layer and the back-coat layer is 0.9 or lower under the conditions of 20° C. and 65%RH, and the amount of binder in the back-coat layer is 5–70 parts by weight based on 100 parts by weight of the pigment in the back-coat layer.

2. An inkjet recording sheet according to claim 1, wherein the gloss developing layer comprises an alumina hydrate.

3. An ink jet recording sheet according to claim 1 or 2, wherein the pigment used in the back-coat layer is at least one pigment selected from the group consisting of kaolin, talc, calcium carbonate and synthetic amorphous silica.

4. An ink jet recording sheet according to claim 1, wherein the back-coat layer contains a lubricant.

5. An ink jet recording sheet according to claim 1, wherein the gloss developing layer comprises colloidal silica.

6. An ink jet recording sheet according to claim 5, wherein the pigment used in the back-coat layer is at least one pigment selected from the group consisting of kaolin, talc, calcium carbonate and synthetic amorphous silica.

7. An ink jet recording sheet according to claim 6, wherein the back-coat layer contains a lubricant.

8. An inkjet recording sheet according to claim 1, wherein the pigment used in the ink receiving layer is a porous inorganic pigment.

9. An ink jet recording sheet according to claim 8, wherein the porous inorganic pigment is porous synthetic amorphous silica or porous alumina.

* * * * *